United States Patent Office.

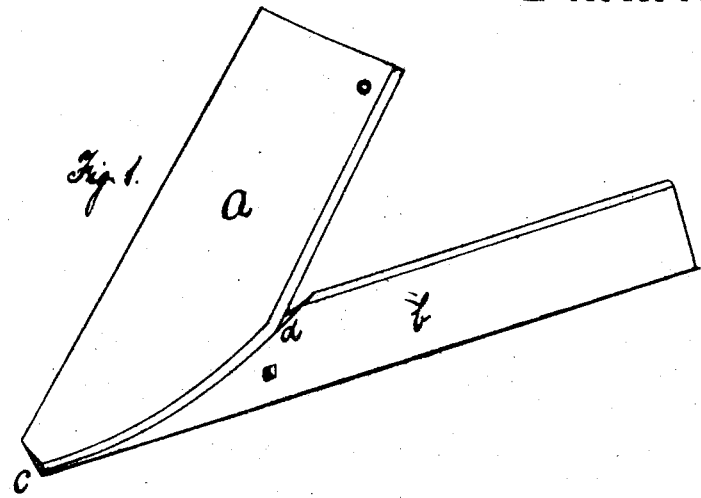
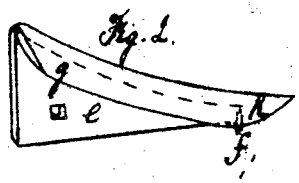
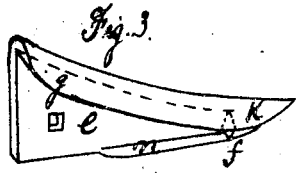
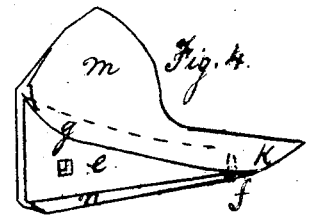
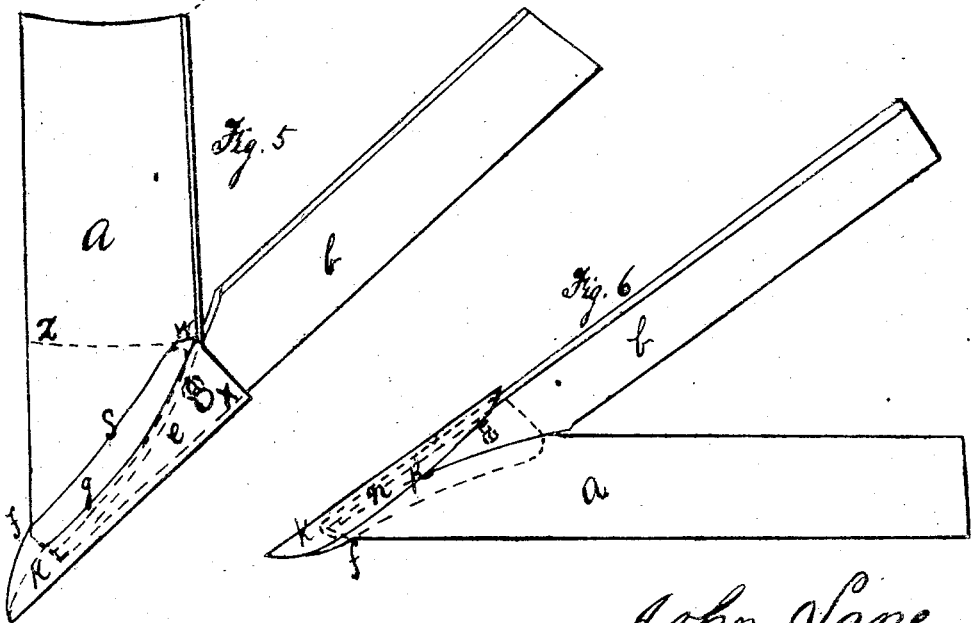

JOHN LANE, OF CHICAGO, ILLINOIS.

Letters Patent No. 76,208, dated March 31, 1868.

IMPROVEMENT IN PLOUGHS.

*The Schedule referred to in these Letters Patent and making part of the same.*

TO ALL WHOM IT MAY CONCERN:

Be it known that I, JOHN LANE, of Chicago, in the county of Cook, and State of Illinois, have invented a new and useful Improved Plough; and I do hereby declare and make known that the following is a full, clear, and exact description of the same, reference being had to the accompanying drawings, forming part of this specification.

My invention relates particularly to that class of ploughs known as steel ploughs, where the lay is welded to a land-side bar; and the nature of my invention is the combining therewith a removable slip-point, of particular construction, which protects the line of weld, and receives the brunt of wear, as hereinafter described.

To enable others skilled in the art to make and use my invention, I will proceed to describe the same, referring to the drawings, and the letters marked thereon. Like letters in the different figures refer to like parts.

I make the lay and land-side, and weld them together, as in common practice.

Figure 1. A is the lay; B is the land-side; C to d, the line welded. The end or point of the lay is blunted, as shown at c. The removable point is made of cast metal or wrought steel. It is made so as to provide a covering or facing to the land-side and lay at the line of weld, and extending forward, producing a point to receive the brunt of wear, and is secured to the plough by a bolt through the land-side.

Figures 2, 3, and 4 are views of the removable point as I make it. $l$ is the side to face or protect the land-side. $g$ is a flange, on the side of the upper edge, to rest on the top of the lay. $f$ is a shoulder, against which the blunt end, $c$, of the plough is to rest. $k$ is the extension, to receive the brunt of wear. $n$ is a flange, on the side of the lower edge, which I sometimes make to rest on the under side of the land-side, which may be as shown in fig. 4, or only extending but a part or short distance, as in fig. 3. I sometimes make a pin-cutter, $m$, on the top edge, as shown in fig. 4, for the purpose of cutting sod-land. The angle produced by the side $e$ and flange $g$ forms a groove or recess, in which is protected the line of weld from wear.

Figure 5 is a view of the lay and land-side welded, the removable point attached, secured by a bolt, $x$, through the land-side. The edge, S, of the flange $g$ is in line of travel of the soil, and is edged off smooth. No clogging on of the soil can take place, as is the case where one piece of metal overlaps another in a cross-direction, as from $w$ to $z$.

Figure 6 gives a view of the under side of the plough with the point attached, the line R showing how I sometimes add the flange $n$. The removable point, as I make it, is readily attached to an old plough, the point and line of weld of which have become worn by use, securely protecting it from further wear.

I do not claim the attaching of a separate piece of metal to the point of the plough; neither do I herein claim either of the parts herein described, separately considered; but having thus described my invention, What I now desire to secure by Letters Patent, is—

The particular form and construction of the slip-point, as arranged, either with or without the flange $n$, and either with or without the pin-cutter $m$, in combination with a lay and land-side welded together, as described, and for the purpose shown.

JOHN LANE.

Witnesses:
ERNEST J. LANE,
JULIUS A. LANE.